United States Patent
McQuiggan

(10) Patent No.: US 7,398,642 B2
(45) Date of Patent: Jul. 15, 2008

(54) GAS TURBINE SYSTEM INCLUDING VAPORIZATION OF LIQUEFIED NATURAL GAS

(75) Inventor: Gerard McQuiggan, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 575 days.

(21) Appl. No.: 11/051,798

(22) Filed: Feb. 4, 2005

(65) Prior Publication Data

US 2006/0174627 A1 Aug. 10, 2006

(51) Int. Cl.
*F02C 3/22* (2006.01)
(52) U.S. Cl. .................. 60/39.465; 60/772
(58) Field of Classification Search ........ 60/39.465, 60/728, 772
See application file for complete search history.

(56) References Cited

U.S. PATENT DOCUMENTS

| | | | | |
|---|---|---|---|---|
| 3,867,811 A | * | 2/1975 | Waeselynck | 60/773 |
| 4,231,226 A | * | 11/1980 | Griepentrog | 60/648 |
| 4,329,842 A | * | 5/1982 | Hoskinson | 60/39.465 |
| 4,330,998 A | * | 5/1982 | Nozawa | 60/655 |
| 4,896,499 A | * | 1/1990 | Rice | 60/792 |
| 5,806,298 A | | 9/1998 | Klosek et al. | |
| 6,345,493 B1 | | 2/2002 | Smith et al. | |
| 6,363,706 B1 | | 4/2002 | Meister et al. | |
| 6,367,258 B1 | | 4/2002 | Wen et al. | |
| 6,510,695 B1 | | 1/2003 | Fisher | |
| 7,028,481 B1 | * | 4/2006 | Morrow | 60/649 |
| 2001/0004830 A1 | | 6/2001 | Wakana et al. | |
| 2003/0101728 A1 | * | 6/2003 | Wakana et al. | 60/727 |
| 2004/0025490 A1 | | 2/2004 | Paul | |
| 2004/0083731 A1 | | 5/2004 | Lasker | |
| 2004/0148941 A1 | | 8/2004 | Wylie | |
| 2005/0223712 A1 | * | 10/2005 | Briesch et al. | 60/772 |
| 2007/0089423 A1 | * | 4/2007 | Norman et al. | 60/772 |

FOREIGN PATENT DOCUMENTS

| | | | |
|---|---|---|---|
| JP | 55119922 | * | 9/1980 |
| JP | 55119922 A | | 9/1980 |
| JP | 55125324 | * | 9/1980 |
| JP | 55134716 | * | 10/1980 |
| JP | 55153808 | * | 12/1980 |
| JP | 56081207 A | | 7/1981 |
| JP | 56162227 | * | 12/1981 |
| JP | 56162227 A | | 12/1981 |
| JP | 10121913 A | | 5/1998 |
| JP | 2003020914 A | | 1/2003 |

* cited by examiner

*Primary Examiner*—William H Rodriguez

(57) ABSTRACT

A gas turbine cycle that utilizes the vaporization of liquefied natural gas as an intercooler in an open loop gas turbine system. The system provides an increase in gas turbine cycle efficiencies while providing a convenient system for vaporizing liquefied natural gas. The systems and methods of the present invention permit the vaporization of liquefied natural gas using air that has been compressed in a first compressor, with the resulting cooled air being easier to compress and/or having fewer contaminants therein for compression in a second compressor. As the air is easier to compress, less energy is needed to operate the second compressor, thereby increasing the efficiency of the system. Additionally, unlike prior art systems that use water as an intercooler, no additional equipment is needed to cool the vaporized natural gas, such as cooling towers.

10 Claims, 1 Drawing Sheet

GAS TURBINE SYSTEM INCLUDING VAPORIZATION OF LIQUEFIED NATURAL GAS

FIELD OF THE INVENTION

This invention is directed generally to turbine systems, and more particularly to open loop gas turbine systems utilizing the thermodynamic heat sink potential of liquefied natural gas.

BACKGROUND

One method of thermal power generation is by gas turbines that are powered by the combustion of some fuel, and it may be applied to power plants having a capacity up to several hundreds of thousand of kilowatts. Additionally, there are methods of thermal power generation that are commonly called combined cycle power generation. These methods are based on a gas turbine cycle and a steam cycle in combination. The steam cycle is powered by the exhaust energy from the gas turbine cycle. They offer an advantage of being started and stopped easily and allow easy control for load variation. Moreover, these combined methods of power generation are more efficient than the gas turbine cycle or ordinary steam power generation alone.

Gas turbine engines generally include a high pressure compressor for compressing air flowing through the engine, a combustor in which fuel is mixed with the compressed air and ignited to form a high energy gas stream, and a high pressure turbine. The high pressure compressor, combustor and high pressure turbine sometimes are collectively referred to as the core engine. Such gas turbine engines also may include a low pressure compressor, or booster, for supplying compressed air, for further compression, to the high pressure compressor.

The general trend in combined cycle power generation in regions where natural gas availability is an issue is toward firing the gas turbine with revaporized liquefied natural gas which is a clean fuel. Combined cycle power generation involving liquefied natural gas will become more important in the countries and areas where energy demand is expected to increase in the future. Liquefied natural gas is desirable from the standpoint of stable supply in view of its huge reserves and also from the standpoint of environmental protection.

In the meantime, a gas turbine has the disadvantage of decreasing in output with increasing atmospheric temperature. This is caused by an increase in atmospheric temperature that decreases the density of air being supplied to the gas turbine. The lower the density of air, the smaller the mass of air in the same volume. Unfortunately, atmospheric temperature is highest in the afternoon in summer when the electric power consumption and demand can be high due to increase in operation of equipment such as air conditioners. In other words, the output of gas turbines is lowest when the electric power consumption is highest. This prevents high efficiency of the gas turbine cycle for power generation. As such, there have been attempts to improve the efficiencies of gas turbine plants.

In one method to satisfy the demand for an engine that can output a high shaft horse power even when the engine ambient temperature is high, e.g., on hot days, inlet system evaporative coolers or refrigeration systems that reduce inlet air temperature typically are utilized. It also is known to use water spray fogging devices to inject water into either the booster or the compressor. Such coolers or other refrigeration systems are used on hot days to cool the air supplied to the core engine and enable increased horsepower output.

Although coolers, refrigeration systems and fogging devices are effective in facilitating high power output from a gas turbine engine on a hot day, these systems and devices also typically require water pumps, pressurized air for aspiration, and other components which increase the engine cost, including maintenance cost. In addition, such systems and devices require water clean-up.

In another method, it has been proposed to extend a gas turbine plant with a waste-heat boiler and to combine the gas turbine plant with a steam turbine plant. The gas turbine and the steam turbine each drive their own generator or drive a single generator via a common shaft. These combination plants, referred to as combined cycle plants, are generally distinguished by their very good energy conversion efficiencies which range in the order of magnitude from 50 to 58%. These high efficiencies result from the cooperation of a gas turbine with at least one steam turbine plant. The gas turbine exhaust gases are passed through a waste-heat boiler and the residual heat potential of these waste-gases is utilized for producing the steam required for feeding the steam turbine. LNG has been used in combined cycle plants as a combustion energy source.

LNG is normally transported as a cryogenic liquid in specialized vessels. At the receiving terminal this cryogenic liquid, which is approximately at atmospheric pressure and at a temperature of around $-260°$ F., has to be regasified and fed to a distribution system at ambient temperature and at a suitably elevated pressure, typically ranging up to 80 atmospheres. The liquid may be pumped to the required pressure so that when heat is added and it is regasified, no compression of the resultant natural gas is required.

Although many suggestions have been made and some installations have been built to utilize the large cold potential of the LNG, in most receiving terminals the cold potential is wasted and the LNG is simply heated with a large flow of sea water that has to be applied in such a manner as to avoid ice formation.

At a few terminals, the cold potential is utilized in air separation plants or similar cryogenic installations or for refrigeration purposes in the freezing and storing of foodstuffs. It has also been proposed to use the cold LNG as a heat sink in a power cycle to generate electrical energy. A number of possible cycles have been proposed which seek to overcome the difficulties caused by the large temperature difference through which the LNG is heated and the particular shape of the warming curve. However, it has been found that even with relatively simple cycles only a small part of the available cold potential can be utilized. Proposals to increase the efficiency employ more complex cycles involving a large number of turbines operating between different pressure levels.

Accordingly what is needed is a gas turbine system that offers increased efficiencies as to prior art gas turbine systems. Also what is needed is a gas turbine system that utilizes liquefied natural gas as a heat sink as well as a possible source of fuel for the turbine system.

SUMMARY OF THE INVENTION

This present invention provides a gas turbine cycle that utilizes the vaporization of liquefied natural gas (LNG) as an intercooler in an open loop gas turbine cycle. This process offers the potential to increase gas turbine cycle efficiencies while providing a convenient system for vaporizing LNG. The systems of the present invention permit the vaporization of LNG using air that has been compressed in a low-pressure compressor, with the resulting cooled air being easier to compress and/or having fewer contaminants therein for compression in a high-pressure compressor. As the air is easier to compress, less energy is needed to operate the high-pressure compressor, thereby increasing the efficiency of the system. In one embodiment, a portion of the vaporized natural gas may be used as the combustion fuel for the gas turbine system.

These and other embodiments are described in more detail below.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

Figure 1:
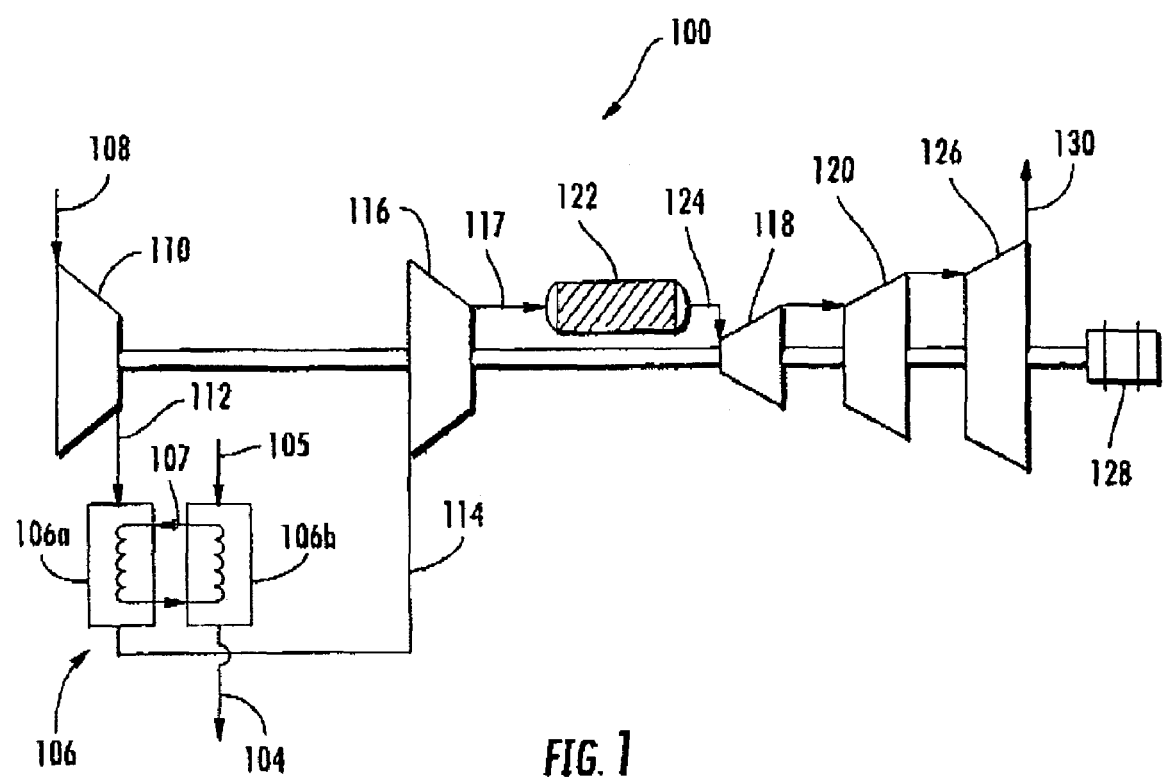
FIG. 1 shows an open loop gas turbine cycle utilizing liquefied natural gas according to one embodiment of the present invention.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides an open loop gas turbine system that utilizes the vaporization of liquefied natural gas as an intercooler between two compressors of a gas turbine. The present invention offers the potential for improved efficiencies. The present invention vaporizes LNG using air coming from a low-pressure compressor, with the resulting cooled air being easier to compress in the high-pressure compressor. As the air is easier to compress, less energy is needed to operate the high-pressure compressor, thereby increasing the efficiency of the system. Other operating efficiencies may also be realized based upon different operating parameters.

In one embodiment, the gas turbine system of the present invention includes an open loop gas turbine system that provides for the use of LNG as part of an intercooler between compressors in the system and designed increase the thermodynamic efficiency of the system while meeting the requirements for LNG vaporization. This gas turbine system may include various embodiments.

In one embodiment, the gas turbine system uses the LNG heat sink potential applied to the chilling of compressor outlet air. In this embodiment, the LNG vaporization takes advantage of the LNG heat sink by vaporizing the LNG while cooling compressed air that has an elevated temperature due to compression in the first compressor. This cooled air is then sent to the second compressor, where it is easier to compress as it is more dense, thereby decreasing the amount of work needed to compress the air in the second compressor.

In this embodiment, the LNG is vaporized by flowing the LNG past air that is has been compressed by a first compressor of an open loop gas turbine cycle. As the LNG temperature during storage may be less than about −160° C., it is possible to develop a vaporization process that utilizes this compressed air as the heat source. During the vaporization process, this air is chilled to and delivered to the second compressor of the gas turbine cycle. Air exiting the first compressor may be at a temperature of approximately 200° C. By using the heat sink potential of the LNG, the air may be cooled to ambient temperature or even colder.

As such, in this embodiment, the LNG is flowed past the air. The LNG is at a temperature of less than about −160° C., while the ambient air is at a temperature of about 20° C. After passing through the heat exchanger, the air has been significantly cooled, while the LNG has been vaporized and is at a temperature closer to the ambient air temperature. The final temperatures of the air and the LNG after vaporization may vary depending on a variety of different factors. Nevertheless, as the cooled air is being sent to a compressor, the more beneficial embodiments significantly cool the air to temperatures about or below about 20° C., thereby making the cooled air easier to compress such that less work and/or energy is needed to compress the air, thereby increasing the efficiency of the system.

The temperature of the vaporized natural gas again may vary. Depending on the volume of the air to be cooled, the volume of the LNG to be vaporized, the selected temperature of the air, and/or the selected temperature of the vaporized natural gas after passing through the heat exchanger, the temperature of the vaporized natural gas again may vary over a wide range. In one embodiment, the temperature of the vaporized natural gas may be greater than about −40° C. In an alternative embodiment, the temperature of the vaporized natural gas may be greater than about −10° C. In still another embodiment, the temperature of the vaporized natural gas may be greater than about 10° C.

Again, depending on the volume of the air to be cooled, the volume of the LNG to be vaporized, the selected temperature of the air, and/or the selected temperature of the vaporized natural gas after passing through the heat exchanger, the flow rates of the air to the LNG may vary. In one embodiment, wherein the air is cooled to a temperature of about 20° C. and the LNG is vaporized to a temperature of about 10° C., the mass ratio of the air flow rate to the LNG flow rate is about 4 to 1. If warmer air and/or warmer natural gas are beneficial, then the flow mass ratio of the air flow rate to the LNG flow rate may be higher. Alternatively, if colder air and/or colder natural gas are beneficial, then the flow mass ratio of the air flow rate to the LNG flow rate may be lower.

As it beneficial for the air to remain free from impurities before and during chilling, it is beneficial to use a heat exchanger wherein the ambient air and the LNG do not contact one another during the heat exchange. In one embodiment, a shell and tube heat exchanger is used to cool the air and vaporize the LNG. However, any heat exchanger capable of cooling air and vaporizing LNG without contacting the two fluid streams may be used in the present invention.

In an alternative embodiment, the air may first be delivered to a drying and/or conditioning stations such that all moisture and/or other condensables are removed. This may be done to avoid the formation of "ice" within the heat transfer or compression equipment. The air would then be passed to the LNG vaporizer where it would be cooled. Alternatively, the air may be cooled to a temperature above 0° C. to help prevent the formation of ice.

In yet another alternative embodiment, to avoid any risk of vaporized natural gas leaking into the air stream, the vaporization may include two heat exchangers, with a working fluid, such as glycol, being used to facilitate the heat transfer from the compressed air to the LNG. In this embodiment, a first heat exchanger is provided wherein glycol is used to cool the compressed air to a selected temperature, with the cooled air being sent to the second compressor. The heated glycol is then sent to a second heat exchanger wherein it is cooled by the LNG, resulting in a cooled glycol stream that is sent to the first heat exchanger and in the vaporization of the LNG.

Once the compressed air has been cooled, it is then sent to a second compressor wherein the air is then pressurized to support the requirements of the combustion and expander systems. As the cooled air is much more dense than heated air that normally comes from a first compressor, the amount of work needed to compress the cooled air is significantly reduced as compared to the amount of work or energy needed to compress heated air. This is one aspect of the present invention that helps increase the efficiency of the overall system.

Once the air has been compressed again in the second compressor, the air is at an increased temperature such that it may effectively be used in the combustion process. Nevertheless, depending on the temperature of the air as it enters the second compressor, it may be beneficial, in some embodiments, to heat the air further. This may be accomplished using a regenerative heat exchanger. In one embodiment, the air is heated by using the exhaust gases from the turbine to heat the compressed air to the selected temperature. By using the exhaust gases from the turbine to heat the compressed air prior to combustion, less combustion fuel is needed to effectively operate the combustion process, thereby increasing the efficiency of the overall process. Also, by removing excess heat from the exhaust gases, the gases may be more easily discharged into the environment without additional treatment.

After being compressed in the second compressor, the air is sent to the combustor wherein it is used, along with a combustion fuel, to operate the turbine. The combustion fuel may be any fuel capable of being used in a gas turbine system. In one embodiment, the combustion fuel is natural gas. In yet another embodiment, the combustion fuel is natural gas that was vaporized by the previously described process. As the compressed air has been heated by the exhaust gases from the turbine, less combustion fuel is needed. As such, in those embodiments wherein a portion of the LNG that has been vaporized is used as the combustion fuel, the remaining vaporized natural gas may be sent to a pipeline.

The present invention may utilize one or more turbines. As a turbine is generally used to operate a compressor, each of the two compressors may have their own turbine. Or a single turbine may be used to operate both compressors. In addition, as the compressed air and combustion fuel are combusted and the combustion products are sent to a turbine, a third turbine may be used to supply work to a generator. In yet another alternative embodiment, a single turbine is used to power the two compressors and the generator.

The systems of the present invention utilize two compressors. In one embodiment, the first compressor is a low-pressure compressor and the second compressor is a high pressure compressor. Alternatively, both compressors may be low pressure compressors or high pressure compressors.

Referring now to FIG. 1, one embodiment of a gas turbine system according to the present invention as set forth. In this embodiment, the system 100 includes a liquefied natural gas source 105 that may be sent to an LNG vaporizing heat exchanger system 106. Inlet air 108 is sent to a liz-sr compressor 110, wherein it is compressed and then sent 112 to the LNG vaporizing htar exchanger system 106.

In the hear exchanger system 106, the compressed air 112 is cooled through a first hear exchanger 106a by a working fluid, such glycol, in a working fluid circuit 107. The heated glycol 107 can then be used in a second heat exchanger 106b to vaporize the LNG stream 105. The vaporized natural gas 104 may be sent to a pipeline.

The cooled compressed air 114 may be sent to a second compressor 116, wherein the cooled air 114 is further compressed. A first turbine 118 may be used to power the first compressor 110 and a second turbine 120 may be used to power the second compressor 116.

The compressed air 117 may then be sent to a combustor 122. A fuel supply is used to power the combustor 122. The fuel supply may be any fuel source including, but not limited to, vaporized natural gas. After combustion, the combustion products 124 may be expanded in the first turbine 118, the second turbine 120, and/or a third turbine 126. The third turbine 126 may be a variable speed power turbine and may be used to supply work to a generator 128. Exhaust gases 130 from the third turbine may be vented for cooling or used as a heat source in another portion of the system.

Accordingly, the present invention provides a method for cooling compressed air between two compressors while vaporizing LNG. As the compressed air is cooled to lower temperatures than prior art systems, the present invention offers a much more efficient system than prior art systems as less energy is needed to compress the air after being chilled. In addition, as the system is an open loop system there are no concerns with cooling the working fluid after expansion through the turbine. And as LNG is used as the intercooler, rather than water as with prior art systems, no cooling towers or other means are needed to cool the water as the heat from the compressed air from the first compressor is sufficient to vaporize the LNG. As such, the systems of the present invention eliminate the need to use water to vaporize LNG and the need to cool water that has been used to cool air in an intercooler, thereby making the entire process more efficient than prior art systems.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A gas turbine system comprising:
   an inlet air source;
   a first compressor for compressing the inlet air;
   a source of liquefied natural gas;
   a heat exchanger capable of vaporizing the liquefied natural gas using heat from the compressed inlet air from the first compressor;
   a second compressor for compressing cooled air from the heat exchanger;
   a combustor for combusting air from the second compressor with a combustion fuel; and
   a turbine for expanding combustion products from the combustor;
   wherein the heat exchanger comprises:
   a working fluid;
   a first heat exchanger for cooling the compressed inlet air from the first compressor and heating the working fluid; and
   a second heat exchanger for vaporizing the liquefied natural gas using heat from the heated working fluid.

2. The system of claim 1, wherein the heat exchanger is a shell and tube heat exchanger.

3. The system of claim 1, wherein the working fluid is glycol.

4. The system of claim 1, wherein the first compressor is a low-pressure compressor and the second compressor is a high-pressure compressor.

5. A method of operating an open loop gas turbine system comprising the steps of:

compressing inlet air in a first compressor;
passing the compressed air into a heat exchanger to cool the compressed air and to vaporize liquefied natural gas;
passing the cooled compressed air into a second compressor to compress the cooled compressed air;
combusting the air from the second compressor with a combustion fuel in a combustor; and
expanding combustion products from the combustor;
wherein the heat exchanger comprises:
a working fluid;
a first heat exchanger for cooling the compressed inlet air from the first compressor and heating the working fluid; and
a second heat exchanger for vaporizing the liquefied natural gas using heat from the heated working fluid.

6. The method of claim 5, wherein the heat exchanger is a shell and tube heat exchanger.

7. The method of claim 5, wherein the working fluid is glycol.

8. The method of claim 5, wherein the first compressor is a low-pressure compressor and the second compressor is a high-pressure compressor.

9. The method of claim 5, wherein the air from the first compressor is cooled to a temperature of less than about 20° C.

10. The method of claim 9, wherein the air from the first compressor is cooled to a temperature of less than about 0° C.

* * * * *